United States Patent
Chong (10) Patent No.: US 11,431,530 B2
(45) Date of Patent: Aug. 30, 2022

(54) SELECTABLE MODE TRANSMITTER DRIVER

(71) Applicant: Euhan Chong, Kanata (CA)

(72) Inventor: Euhan Chong, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 17/010,567

(22) Filed: Sep. 2, 2020

(65) Prior Publication Data

US 2022/0070029 A1   Mar. 3, 2022

(51) Int. Cl.
*H04L 25/02* (2006.01)

(52) U.S. Cl.
CPC ........ *H04L 25/0272* (2013.01); *H04L 25/028* (2013.01); *H04L 25/0278* (2013.01)

(58) Field of Classification Search
None
See application file for complete search history.

(56) References Cited

U.S. PATENT DOCUMENTS

| | | | | |
|---|---|---|---|---|
| 7,511,530 B1* | 3/2009 | Cox | ..................... | H04L 25/0272 326/83 |
| 7,952,397 B2* | 5/2011 | Raghavan | ...... | H03K 19/018521 326/82 |
| 8,446,173 B1* | 5/2013 | Faucher | ........... | H03K 19/00361 326/86 |
| 8,587,339 B2* | 11/2013 | Johnson | ................ | H04L 25/026 326/82 |
| 9,325,316 B1* | 4/2016 | Abou-El-Sonoun | ......................... | H03K 19/018514 |
| 9,455,713 B1* | 9/2016 | Kadkol | .......... | H03K 19/018514 |
| 9,608,845 B2* | 3/2017 | Chong | .............. | H04L 25/03019 |
| 9,948,293 B1* | 4/2018 | Lau | ..................... | H03K 17/6872 |
| 10,044,377 B1* | 8/2018 | Chong | ................ | H04L 25/0272 |
| 2009/0168854 A1* | 7/2009 | Liang | .................. | H04L 25/0272 375/300 |

(Continued)

FOREIGN PATENT DOCUMENTS

| CN | 103959727 A | 7/2014 |
|---|---|---|
| CN | 106575965 A | 4/2017 |

(Continued)

OTHER PUBLICATIONS

U.S. Appl. No. 16/511,200, "Method and Apparatus for Multi-Mode Multi-Level Transmitter", filed Jul. 15, 2019.

*Primary Examiner* — Thomas J. Hiltunen
*Assistant Examiner* — Khareem E Almo (57) ABSTRACT

A circuit for a transmitter driver is disclosed. The transmitter driver circuit includes a main voltage-mode driver circuit configured to receive an input signal at the input port and to drive an output signal at the output port. The transmitter driver circuit also includes a secondary circuit connected to the input port and the output port in parallel with the main voltage-mode driver circuit. The secondary circuit includes: a secondary voltage-mode driver circuit; a current source connected to the secondary voltage-mode driver circuit and controllable to enable or disable a current boost to the output signal; and a switch connected to the secondary voltage-mode driver circuit and controllable to enable or disable the secondary voltage-mode driver circuit to drive the output signal in parallel with the main voltage-driver circuit.

18 Claims, 10 Drawing Sheets

(56) References Cited

U.S. PATENT DOCUMENTS

| | | | | |
|---|---|---|---|---|
| 2010/0232079 A1* | 9/2010 | Wu | ............... | H01L 27/0288 |
| | | | | 361/56 |
| 2015/0171830 A1* | 6/2015 | Low | ............... | H03K 3/011 |
| | | | | 307/18 |
| 2016/0197598 A1 | 7/2016 | Wu et al. | | |
| 2017/0019278 A1* | 1/2017 | Kireev | ............ | H03K 19/09425 |
| 2018/0041232 A1* | 2/2018 | Lim | ............... | H03K 17/163 |
| 2019/0349226 A1* | 11/2019 | Chong | ............ | H04L 25/03343 |

FOREIGN PATENT DOCUMENTS

| | | |
|---|---|---|
| EP | 1744458 A1 | 1/2007 |
| WO | 2018141290 A1 | 8/2018 |

\* cited by examiner

SELECTABLE MODE TRANSMITTER DRIVER

FIELD

The present disclosure is related to transmitter drivers, in particular transmitter drivers with increased output swing.

BACKGROUND

Output swing of a transmitter is an important factor for improving performance of a transmitter, particularly over poor quality (or "lossy") channels or for long-distance transmissions. The swing of a transmitter refers to the peak-to-peak amplitude of the output signal. Typically, the larger the swing, the better the performance (e.g., higher signal-to-noise ratio (SNR)).

There have been attempts to increase the output swing using a high efficiency voltage mode driver in combination with a current mode logic (CML) current boost circuit. However, such a circuit requires additional chip area to implement and has increased power demands. Further, there is a risk of electrical overstress (EOS), as amplitude increases. In practice, this limits the maximum swing that can be achieved, because the circuit must be operated with a margin of safety below the EOS voltage.

Other attempts to achieve a voltage mode driver with high-swing boost, such as providing a low impedance (low-Z) driver circuit in parallel with the CML circuit. However, such a design again requires additional chip area to implement, and has increased power demands. Further, a low-Z driver changes the impedance of the transmitter driver, which can lead to unwanted reflections (especially for lower loss channels). A low-Z parallel circuit also requires a parallel pre-driver path, which can increases chip area and power demands.

It would be useful to provide a circuit for a transmitter driver that can provide the desired high output swing, with lower demands for power consumption and chip area.

SUMMARY

The present disclosure describes a transmitter driver circuit that is controllable to operation in different selectable modes of operation. The modes of operation include a first mode of operation in which the transmitter driver circuit operates as a regular voltage-mode driver circuit, a second mode of operation that enables a parallel pseudo-CML circuit, and a third mode of operation that enables a parallel low-Z circuit.

The transmitter driver circuit as disclosed can achieve the advantages of existing driver circuits that use parallel CML circuits and/or parallel low-Z circuits, while mitigating or avoiding the drawbacks of such existing driver circuits.

By combining the low-Z parallel path with the pseudo-CML parallel path, the disclosed transmitter driver circuit can be implemented with little additional chip area and little or no additional power usage required.

In some example aspects, the present disclosure describes a transmitter driver circuit including: a main voltage-mode driver circuit connected to an input port and an output port, the main voltage-mode driver circuit configured to receive an input signal at the input port and to drive an output signal at the output port based on the input signal; a secondary circuit connected to the input port and the output port in parallel with the main voltage-mode driver circuit. The secondary circuit includes: a secondary voltage-mode driver circuit; a current source connected to the secondary voltage-mode driver circuit and controllable to enable or disable a current boost to the output signal; and a switch connected to the secondary voltage-mode driver circuit and controllable to enable or disable the secondary voltage-mode driver circuit to drive the output signal in parallel with the main voltage-driver circuit In any of the examples, the transmitter driver circuit may be controllable to operate in one of: a first mode of operation in which the current source is turned off and the switch is turned off, wherein the output signal is driven only by the main voltage-mode driver circuit; a second mode of operation in which the current source is turned on and the switch is turned off, wherein the output signal is driven by the main voltage-mode driver circuit with the current boost provided by the current source; and a third mode of operation in which the current source is turned off and the switch is turned on, wherein the output signal is driven by the main voltage-mode driver circuit and the secondary voltage-mode driver circuit in parallel.

In any of the examples, the secondary voltage-mode driver circuit may include an inverter circuit in series with an electrostatic discharge resistor.

In any of the examples, the electrostatic discharge resistor may have a resistance similar to or smaller than a resistance of the main voltage-mode driver circuit.

In any of the examples, the inverter circuit may include a transistor pair, with gates of the transistor pair being connected to the input port, drains of the transistor pair being connected to the output port via the electrostatic discharge resistor, and the current source and the switch being connected across sources of the transistor pair.

In any of the examples, the current source may include a pair of biasing transistors, the biasing transistors being controllable by an analog biasing signal at respective gates of the biasing transistors to control the current source.

In any of the examples, the switch may include a pair of enabling transistors, the enabling transistors being controllable by a digital enabling signal at respective gates of the enabling transistors to control the switch.

In any of the examples, the transmitter driver circuit may be configured for driving a differential output signal based on a differential input signal.

In any of the examples, the transmitter driver circuit may be configured for driving a single-ended output signal based on a single-ended input signal.

In some example aspects, the present disclosure describes a transmitter including: a serializer; and a transmitter driver having one or more driver slices in parallel. Each driver slice includes: a transmitter driver circuit including: a main voltage-mode driver circuit connected to an input port and an output port, the main voltage-mode driver circuit configured to receive an input signal at the input port and to drive an output signal at the output port based on the input signal; a secondary circuit connected to the input port and the output port in parallel with the main voltage-mode driver circuit. The secondary circuit includes: a secondary voltage-mode driver circuit; a current source connected to the secondary voltage-mode driver circuit and controllable to enable or disable a current boost to the output signal; and a switch connected to the secondary voltage-mode driver circuit and controllable to enable or disable the secondary voltage-mode driver circuit to drive the output signal in parallel with the main voltage-driver circuit.

In any of the examples, each transmitter driver circuit may be controllable to operate in one of: a first mode of operation in which the current source is turned off and the switch is turned off, wherein the output signal is driven only by the main voltage-mode driver circuit; a second mode of operation in which the current source is turned on and the switch is turned off, wherein the output signal is driven by the main voltage-mode driver circuit with the current boost provided by the current source; and a third mode of operation in which the current source is turned off and the switch is turned on, wherein the output signal is driven by the main voltage-mode driver circuit and the secondary voltage-mode driver circuit in parallel.

In any of the examples, in each transmitter driver circuit, the secondary voltage-mode driver circuit may include an inverter circuit in series with an electrostatic discharge resistor.

In any of the examples, in each transmitter driver circuit, the electrostatic discharge resistor may have a resistance similar to or smaller than a resistance of the made voltage-mode driver circuit.

In any of the examples, in each transmitter driver circuit, the inverter circuit may include a transistor pair, with gates of the transistor pair being connected to the input port, drains of the transistor pair being connected to the output port via the electrostatic discharge resistor, and the current source and the switch being connected across sources of the transistor pair.

In any of the examples, in each transmitter driver circuit, the current source may include a pair of biasing transistors, the biasing transistors being controllable by an analog biasing signal at respective gates of the biasing transistors to control the current source.

In any of the examples, in each transmitter driver circuit, the switch may include a pair of enabling transistors, the enabling transistors being controllable by a digital enabling signal at respective gates of the enabling transistors to control the switch.

In some example aspects, the present disclosure describes a method of driving an output signal at a transmitter. The transmitter includes a transmitter driver circuit including: a main voltage-mode driver circuit connected to an input port and an output port, the main voltage-mode driver circuit configured to receive an input signal at the input port and to drive an output signal at the output port based on the input signal; a secondary circuit connected to the input port and the output port in parallel with the main voltage-mode driver circuit. The secondary circuit includes: a secondary voltage-mode driver circuit; a current source connected to the secondary voltage-mode driver circuit and controllable to enable or disable a current boost to the output signal; and a switch connected to the secondary voltage-mode driver circuit and controllable to enable or disable the secondary voltage-mode driver circuit to drive the output signal in parallel with the main voltage-driver circuit. The method includes controlling the transmitter driver circuit to operate in one of: a first mode of operation in which the current source is turned off and the switch is turned off, wherein the output signal is driven only by the main voltage-mode driver circuit; a second mode of operation in which the current source is turned on and the switch is turned off, wherein the output signal is driven by the main voltage-mode driver circuit with the current boost provided by the current source; and a third mode of operation in which the current source is turned off and the switch is turned on, wherein the output signal is driven by the main voltage-mode driver circuit and the secondary voltage-mode driver circuit in parallel.

In any of the examples, the current source may include a pair of biasing transistors. The method further may include: applying an analog biasing signal at respective gates of the biasing transistors to control the current source, the analog biasing signal causing the current source to be disabled in the first and third modes of operation, and the analog biasing signal controlling the current boost in the second mode of operation.

In any of the examples, the switch may include a pair of enabling transistors. The method further may include: applying a digital enabling signal at respective gates of the enabling transistors to control the switch, the digital enabling signal causing the switch to be disabled in the first and second modes of operation, and the digital enabling signal causing the switch to be enabled in the third mode of operation.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Examples described herein may be implemented in a high speed (e.g., 56 Gbps or higher) communication system. Other applications may include other communication systems and transmitters that would benefit from a transmission boost, particularly for transmissions at high frequencies. The present disclosure describes example devices and methods for using a transmitter driver to transmit a signal with increased peak-to-peak amplitude (also referred to as "swing"). The disclosed driver circuits are described in some examples in the context of a finite impulse response (FIR) filter "slice". However, some examples disclosed herein may be implemented for boosting transmitter output in other applications.

Figure 1A:
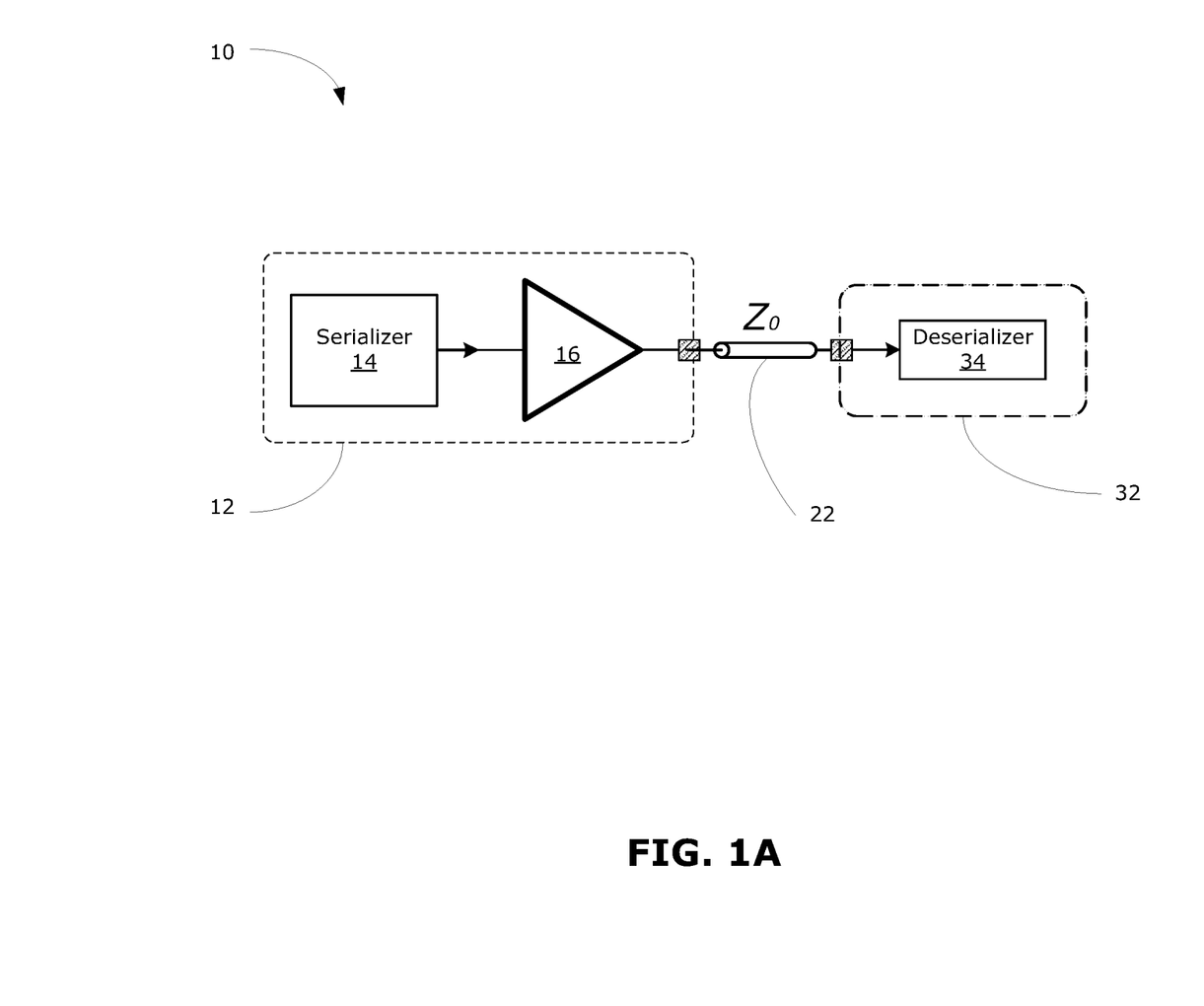
FIG. 1A is a schematic diagram of an example simplified transmitter and receiver communication system.

FIG. 1A is a simplified diagram of a serializer-deserializer (SerDes, or SERDES) system 10, in which a transmitter 12 of a transmitting apparatus transmits a signal over an electrical channel 22 to a receiver 32 of a receiving apparatus. FIG. 1A models the electrical channel 22 as an impedance $Z_0$. The transmitter 12 includes a serializer 14, and a transmitter driver 16, and the receiver 32 includes a deserializer 34. The transmission may be a single-ended transmission (i.e., transmission of a single-ended signal) or a differential transmission (i.e., transmission of a pair of differential signals). Although some examples described herein may be in the context of single-ended transmission or differential transmission, it should be understood that the present disclosure is intended to be equally applicable to both single-ended and differential transmission.

Although FIG. 1A has been described with reference to a transmitting apparatus and a receiving apparatus, it should be understood that each apparatus may be capable of both transmitting and receiving. For example, each apparatus may include at least one respective SerDes transmitter and at least one respective SerDes receiver, thereby allowing bidirectional communication.

Figure 1B:
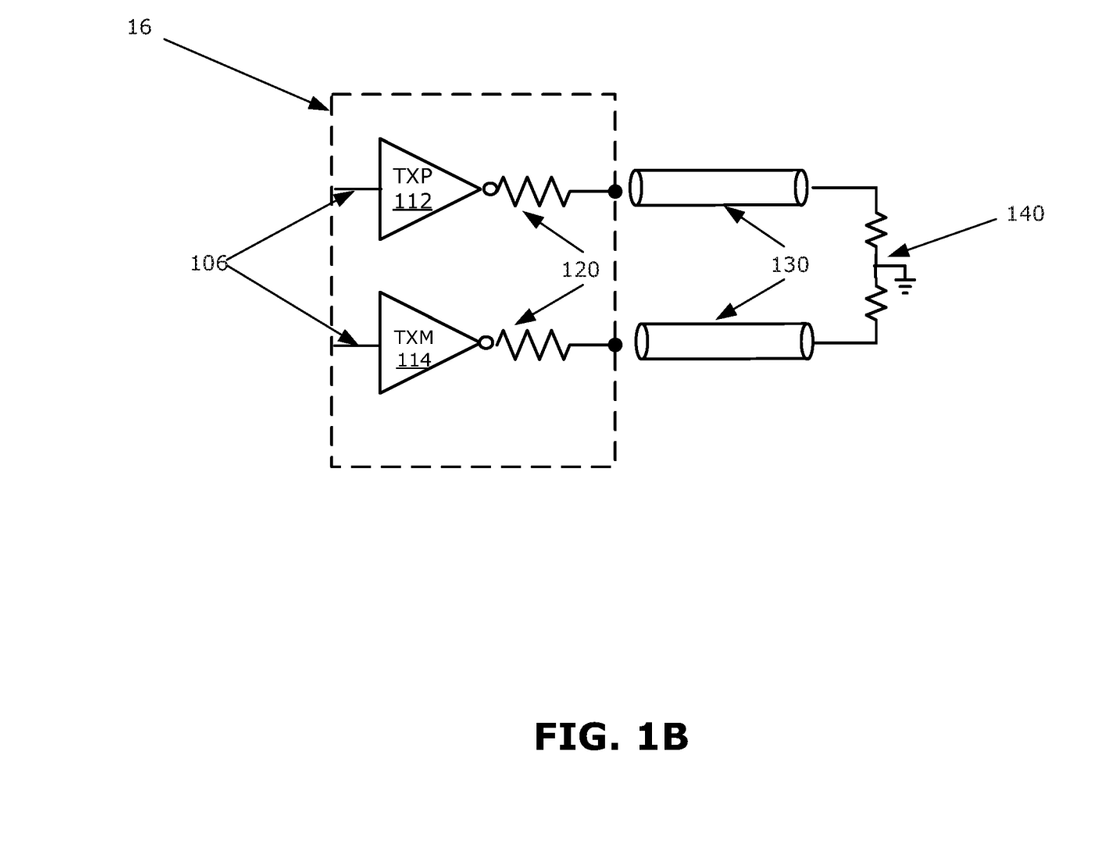
FIG. 1B is a schematic diagram showing an example model for a differential implementation of a voltage-mode transmitter driver.

FIG. 1B shows an example simple differential circuit for a voltage-mode transmitter driver 16. A differential digital input signal 106 is received by a TXP ("transmitter plus") tap 112 and a TXM ("transmitter minus") tap 114 which drive a digital output signal based on the digital input signal 106 across a pair of resistive paths 120 and over a differential communication channel 130 to a receiver-side termination 140 (representing input impedance of the receiver). The receiver-side termination 140 matches the impedance of the transmitter looking into the resistive paths 120 of the transmitter driver 16; for example, receiver-side termination 140 may provide a relatively small impedance (e.g., approximately 50 Ohms), and the resistive paths 120 in parallel may provide a similar relatively small impedance. The differential communication channel 130 is generally lossy, resulting in signal loss or degradation in the absence of equalization applied at either the transmitter or receiver end.

SerDes transmitters typically use a voltage-mode driver and implement FIR feed forward equalization (FFE) of the transmitted signal to compensate for channel loss or distortion. Most commonly, post-cursor equalization is used: one or more single-unit-interval tap delays are used to provide delayed post-cursor samples of the transmitted signal, and these delayed samples are weighed and subtracted from the current signal level to correct for expected time-varying impulse response levels introduced by the communication channel. However, pre-cursor equalization is also possible.

This FIR FFE results in de-emphasis, as the signal peak amplitude level is maintained and the low frequency amplitude is reduced. This reduces the signal-to-noise ratio (SNR), because the eye opening is reduced in order to compensate for inter-symbol interference (ISI).

Figure 1C:
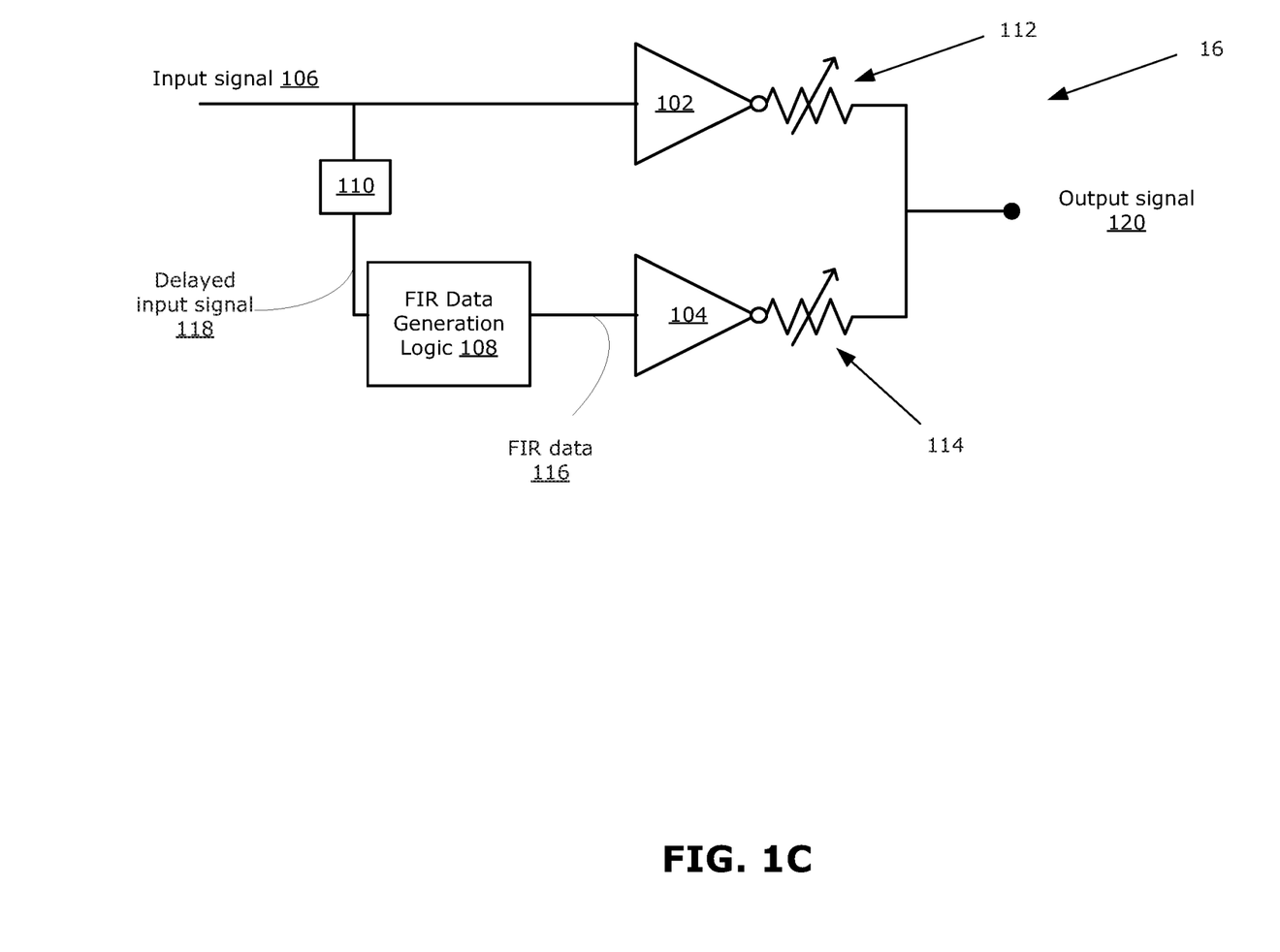
FIG. 1C is a schematic diagram showing an example model of one tap of a voltage-mode transmitter driver using FIR equalization.

FIG. 1C illustrates an example voltage-mode transmitter driver circuit for one-tap post-cursor FIR equalization. The transmitter driver 16 includes a main driver 102 and a parallel FIR tap driver 104.

A digital input signal 106 carrying data to be transmitted over a communication channel is received by the transmitter driver 16. At the first parallel branch, the main driver 102 receives the digital input signal 106 and drives a digital output signal 120 based on the digital input signal 106 across a communication channel. At the second parallel branch, the digital input signal 106 passes through a one-unit-interval delay 110 to produce a delayed input signal 118. The delayed input signal 118 is processed by FIR data generation logic 108, such as a weight applied to the delayed input signal 118 based on the expected FIR of the first post-cursor tap, to generate FIR data 116. The FIR tap driver 104 receives the FIR data 116 and applies 1-tap post-cursor FIR equalization to the digital output signal 120. This example implementation uses a main driver resistive path 112 in parallel with a FIR driver resistive path 114 to achieve a relatively small equivalent impedance (e.g., an equivalent impedance of approximately 50 Ohms).

In some examples, there may be more than one tap for FIR equalization, in which case the number of FIR tap drivers may equal the number of taps used. Each FIR tap driver receiving FIR data may be referred to as a slice, or a driver slice, and there may be multiple such slices in parallel for multi-tap FIR equalization.

In general, FIR equalization is set during a calibration process (e.g., performed at start-up). The resistance of each branch (the parallel paths through the main tap driver 102 and through each driver slice) is not typically changed during operation in response to changes in the received digital input signal 106.

Figure 2:
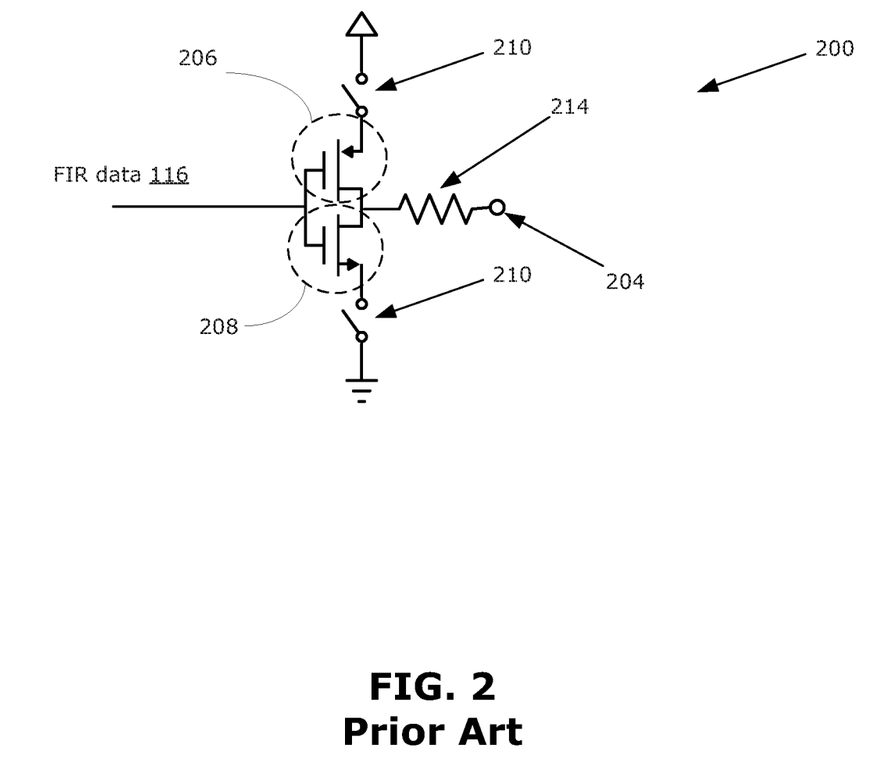
FIG. 2 is a circuit diagram for an example FIR tap driver slice, in accordance with some known transmitter drivers.

FIG. 2 shows an example circuit for a conventional FIR tap driver slice 200. The FIR tap driver slice 200 receives FIR data 116 at a PMOS transistor 206 and an NMOS transistor 208. A pair of switches 210 are operated by a control signal to enable/disable equalization (at that driver slice) by enabling/disabling a signal path through the FIR driver 200. Multiple such driver slices 200 may be placed in parallel (e.g., for multi-tap FIR equalization) and selectively enabled or disabled to apply FIR equalization for each respective driver slice.

To enable the driver slice 200, the switches 210 are operated by a control signal to close. The PMOS transistor 206 connects to a voltage (or current) supply and the NMOS transistor 208 creates a shunt path to ground, effectively increasing resistance and providing de-emphasis. The FIR tap driver slice 200 provides an equalization output signal 204 via a resistive path 214.

However, the de-emphasis applied by conventional FIR equalization has undesirable characteristics. The amplitude of the signal at the transmitter limits the maximum channel capacity according to the Shannon-Hartley theorem. As such, de-emphasis of the signal at the transmitter, as performed in a conventional FIR equalization, limits the maximum channel capacity.

Furthermore, power consumption increases with the amount of equalization applied in conventional FIR equalization. This is because the shunt path to ground is enabled by the FIR tap driver 104 to reduce the signal amplitude.

Some existing voltage-mode driver circuits have been designed with the aim of achieving higher output swing. Higher output swing has been shown to significantly improve performance in long-channel and optical applications. One such existing circuit design uses a current mode logic (CML) current boost circuit in combination with the voltage-mode driver. Another existing circuit design adds a low-impedance (low-Z) circuit in parallel with the CML circuit. As described previously, both the CML driver and the parallel low-Z driver have drawbacks.

Figure 3:
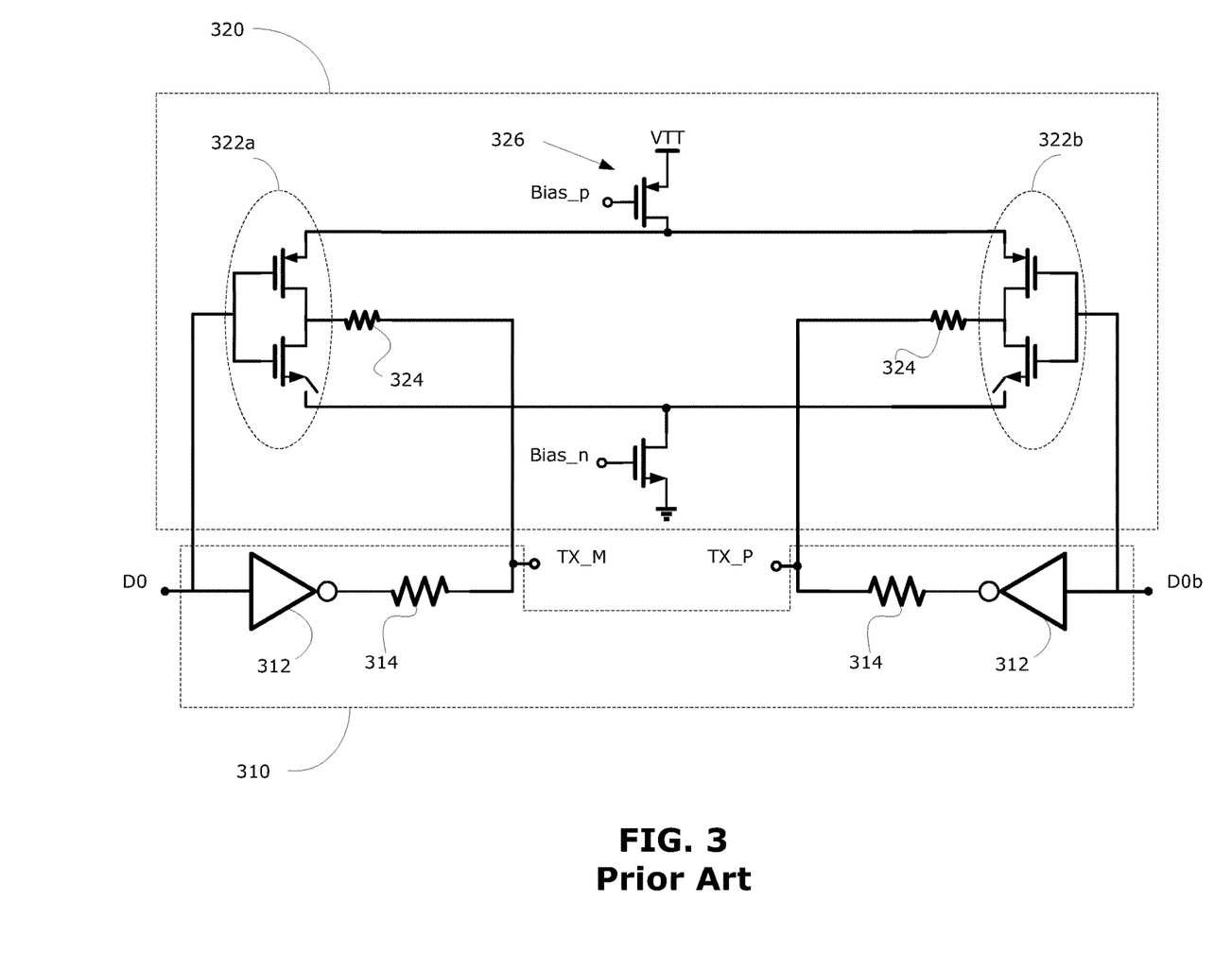
FIG. 3 is a circuit diagram for an example existing voltage-mode driver having a parallel pseudo-CML circuit.

FIG. 3 shows an example circuit for an existing voltage-mode driver with parallel pseudo-CML circuit, which is designed to increase output swing. It may be noted that the reference to a "pseudo"-CML circuit refers to the circuit design in which the input is a rail-to-rail CMOS signal (compared to a typical "true" CML circuit in which the input is not rail-to-rail). A differential implementation of this circuit is shown, which receives a differential input signal pair at input ports D0, D0b, and outputs a differential output signal pair at output ports TX_M and TX_P.

The example circuit of FIG. 3 includes a voltage-mode driver circuit 310 in parallel with a pseudo-CML circuit 320.

Each circuit 310, 320 is connected to the input ports D0, D0b, and is also connected to the output ports TX_M and TX_P.

The voltage-mode driver circuit 310 receives an input signal (in this example, a differential input signal) at the input ports D0, D0b and drives an output signal (in this example, a differential output signal) at the output port TX_M and TX_P based on the input signal. The voltage-mode driver circuit 310 in the example shown includes a pair of inverters 312 and a pair of driver output resistors 314. Each inverter 312 receives input from a respective input port D0, D0b, and is coupled to a respective output port TX_M and TX_P, via the respective driver output resistor 314. The resistance value of each of the driver output resistors 314 may be selected to match the expected impedance of the transmission channel coupled to the output ports TX_M and TX_P. For example, the driver output resistors 314 may each have a resistance of approximately 50 Ohms.

The parallel pseudo-CML circuit 320 includes first and second transistor pairs 322a, 322b (generally referred to as transistor pair 322). The transistor pair 322 acts as a CMOS inverter. In the example shown, the pseudo-CML circuit 320 includes both NMOS and PMOS transistors in each transistor pair 322, but in other implementations there may be only PMOS transistors. The gates of each transistor pair 322 are connected to a respective input port D0, D0b, and the drains of each transistor pair 322 are connected to a respective output port TX_M and TX_P, via a respective electrostatic discharge (ESD) resistor 324. The ESD resistor 326 is typically smaller (in resistance) than the driver output resistor 314, and provides ESD protection for the pseudo-CML circuit 320. For example, when the driver output resistors 314 each have a resistance of approximately 50 Ohms, the ESD resistors 324 may each be approximately 25 Ohms.

The pseudo-CML circuit 320 receives a boost current from a DC current source 326, which in this example is implemented using NMOS and PMOS bias transistors, connected to voltage source VTT and to ground, respectively. Other implementations for the current source 326 may be used. The boost current provided by the DC current source 326 is added to the output of the voltage-mode driver circuit 310 and results in a boost at the output ports output port TX_M and TX_P.

The parallel pseudo-CML circuit 320 has relatively high impedance, meaning the impact on the impedance of the voltage-mode driver circuit 310 is relatively low. Thus, reflection due to impedance mismatch is relatively low. The parallel pseudo-CML circuit 320 is relatively power- and area-efficient, and does not impact FIR equalization. However, a significant drawback of the voltage-mode driver with parallel pseudo-CML is low reliability, due to the risk of electrical overstress (EOS) as the signal amplitude increases. This effectively limits the maximum swing of the output signal.

Figure 4:
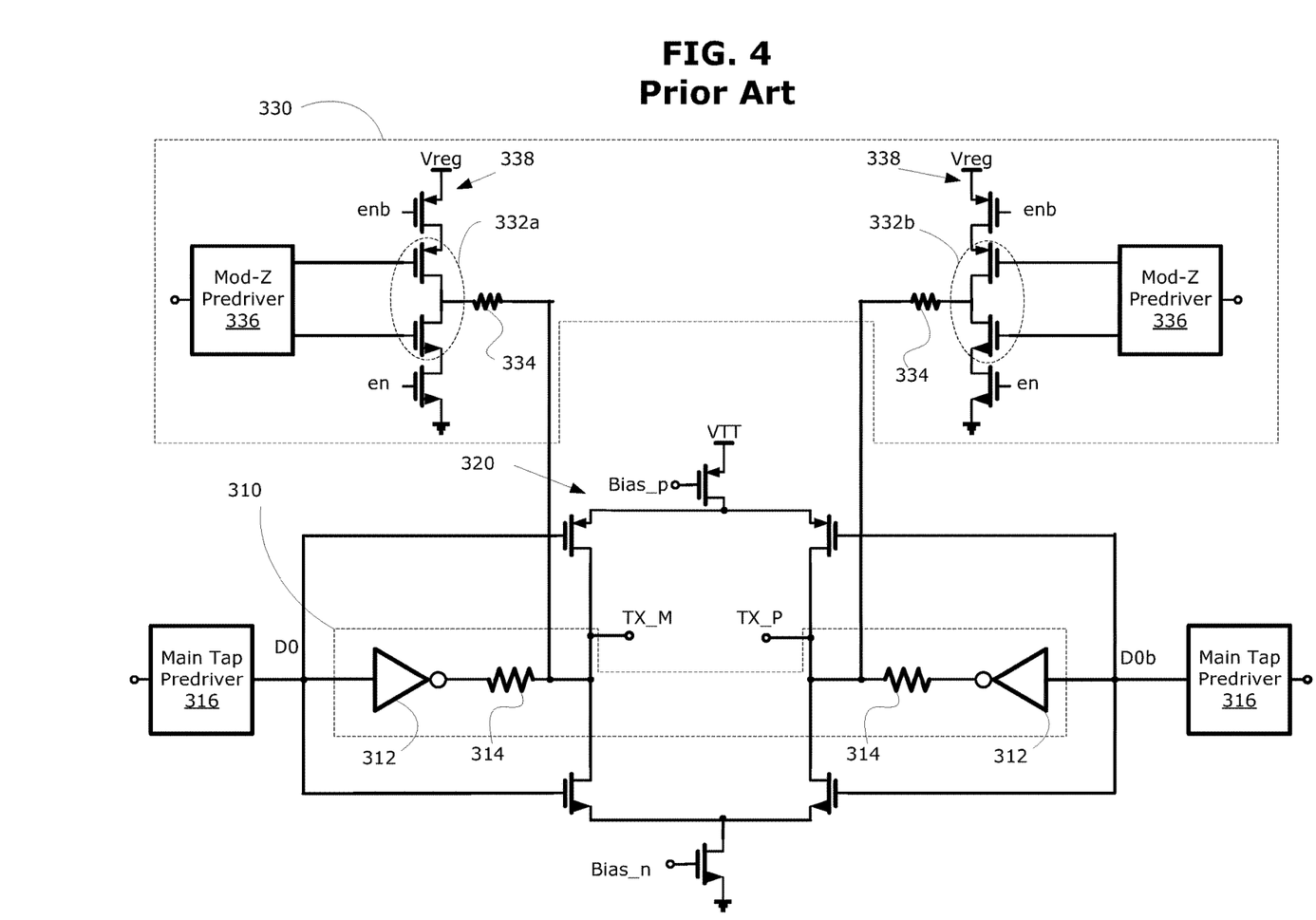
FIG. 4 is a circuit diagram for an example existing voltage-mode driver with parallel pseudo-CML circuit and parallel low-Z circuit.

FIG. 4 shows an example circuit for an existing voltage-mode driver with parallel pseudo-CML circuit and parallel low-Z circuit, which is designed to increase output swing beyond that achievable using the parallel pseudo-CML circuit alone. A differential implementation of this circuit is shown, which receives a differential input signal pair at input ports D0, D0b, and outputs a differential output signal pair at output ports TX_M and TX_P.

The example circuit of FIG. 4 includes the voltage-mode driver circuit 310 in parallel with the pseudo-CML circuit 320 (not labelled in detail for simplicity, the ESD resistors not shown for simplicity) and also in parallel with a low-Z circuit 330.

The voltage-mode driver circuit 310 is similar to that described previously for FIG. 3. Additionally, the main tap predrivers 316 for the voltage-mode driver circuit 310 are shown.

The parallel low-Z circuit 330 includes first and second transistor pairs 332a, 332b (generally referred to as transistor pair 332), each of which acts as an inverter. In the example shown, the low-Z circuit 330 includes both NMOS and PMOS transistors in each transistor pair 332, but in other implementations there may be only PMOS transistors. The gates of each transistor pair 332 are connected to a respective mod-Z predriver 336, and the drains of each transistor pair 332 are connected to a respective output port TX_M and TX_P, via a respective parallel output resistor 334. The parallel output resistor 334 is smaller (in resistance) than the driver output resistor 314. For example, when the driver output resistors 314 each have a resistance of approximately 50 Ohms, the parallel output resistors 334 may each be approximately 25 Ohms.

Each transistor pair 332 in the low-Z circuit 330 receives current from a respective DC current source 338, which in this example is implemented using NMOS and PMOS transistors, connected to voltage source Vreg and to ground, and turned on with control signals en and enb. Other implementations for the current source 338 may be used. When the control signals turn on the current source 338, the parallel low-Z circuit 330 is turned on and acts as a parallel driver circuit to the main voltage-mode driver circuit 310. The parallel output resistors 334 in parallel with the driver output resistors 314 result in an overall low impedance for the circuit.

The addition of the low-Z circuit 330 in parallel with the voltage-mode driver circuit 310 and the pseudo-CML circuit 320 reduces the overall output impedance of the circuit and increases output swing, thus compensating for some of the drawbacks of the pseudo-CML circuit 320. However, adding the low-Z circuit 330 in parallel increases loading at the output node, which can increase inter-symbol interference. Further, the added load requires additional predrivers 336, which leads to increased power-consumption and increased chip area.

In addition, the use of the parallel low-Z circuit 330 has been found to suffer from jitter penalty and power penalty even when the low-Z circuit 330 is turned off. In simulations, it has been found that when the parallel low-Z driver is off, the added parallel circuitry contributes additional output parasitic capacitance, resulting in a significant jitter penalty. Even when the low-Z parallel driver is off, there is loading on the clock-path that introduces a power penalty. Total power penalty introduced by the low-Z parallel driver can be significant (e.g., on the order of ~10 mW).

The present disclosure describes a selectable mode circuit, that can benefit from the advantages of the CML and low-Z circuits, while mitigating some of the drawbacks described above.

Figure 5A:
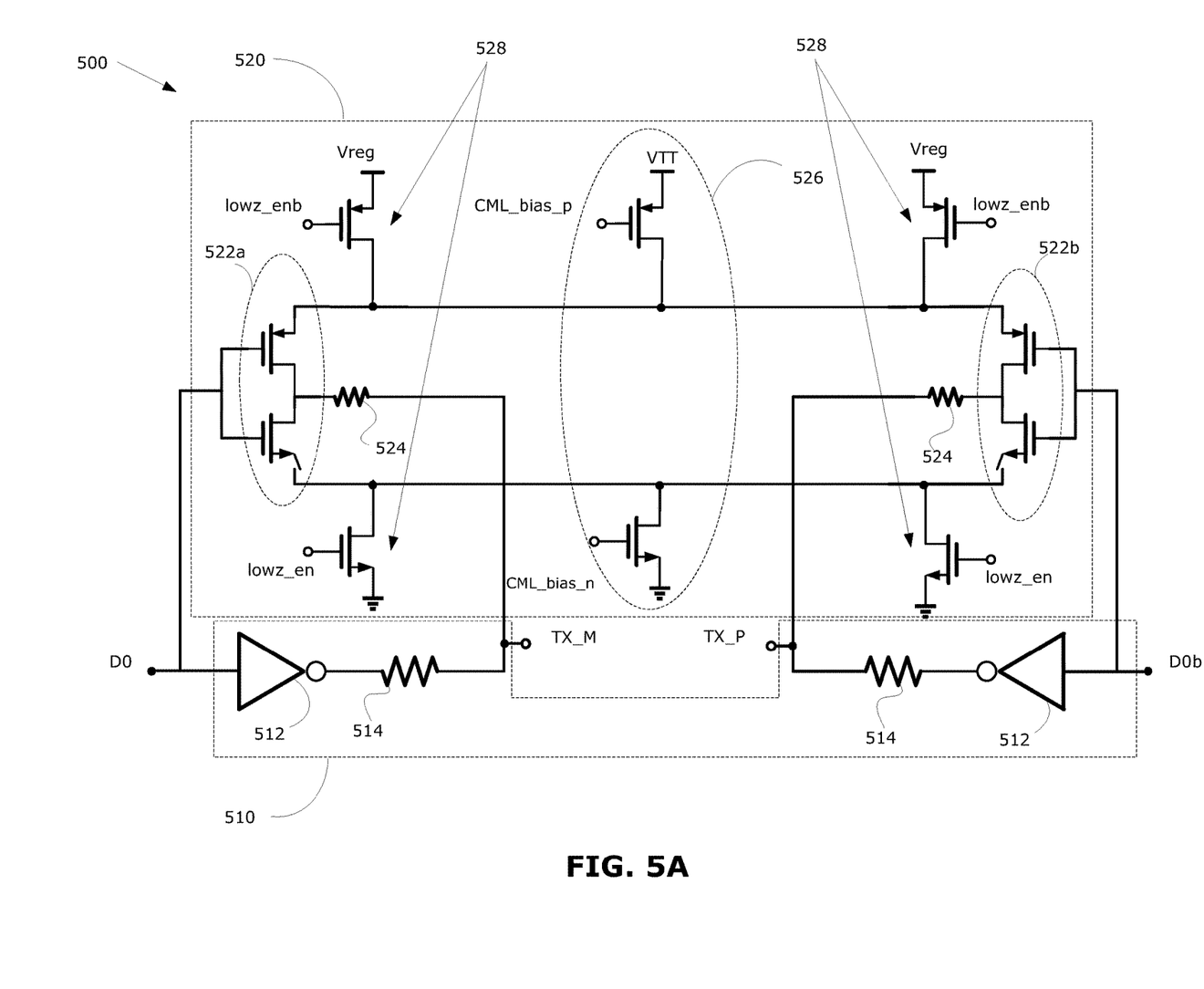
FIG. 5A is a circuit diagram for an example transmitter driver circuit as disclosed herein.

FIG. 5A shows an example circuit of the disclosed selectable mode transmitter driver. The example selectable mode circuit 500 includes the voltage-mode driver, and provides selectable pseudo-CML and low-Z modes of operation in a single parallel path (rather than separate parallel paths). A differential implementation of this circuit is shown, which receives a differential input signal pair at input ports D0, D0b, and outputs a differential output signal pair at output ports TX_M and TX_P. It should be understood that the disclosed circuit for a selectable mode transmitter driver may be realized in a single-ended implementation as well, as will be discussed further below.

The selectable mode circuit 500 includes a voltage-mode driver circuit 510, which is similar to the voltage-mode driver circuit 310 described previously. The main voltage-mode driver circuit 510 is in parallel with a secondary driver circuit 520. Each circuit 510, 520 is connected to the input ports D0, D0b, and is also connected to the output ports TX_M and TX_P.

The voltage-mode driver circuit 510 includes a pair of inverters 512 and a pair of driver output resistors 514. Each inverter 512 receives input from a respective input port D0, D0b, and is coupled to a respective output port TX_M and TX_P, via the respective driver output resistor 514. The resistance value of each of the driver output resistors 514 may be selected to match the expected impedance of the transmission channel coupled to the output ports TX_M and TX_P. For example, the driver output resistors 514 may each have a resistance of approximately 50 Ohms.

The parallel secondary driver circuit 520 includes first and second transistor pairs 522a, 522b (generally referred to as transistor pair 522). The transistor pair 522 acts as a CMOS inverter. In the example shown, the secondary driver circuit 520 includes both NMOS and PMOS transistors in each transistor pair 522, but in other implementations there may be only PMOS transistors. The gates of each transistor pair 522 are connected to a respective input port D0, D0b, and the drains of each transistor pair 522 are connected to a respective output port TX_M and TX_P, via a respective ESD resistor 524. The ESD resistor 524 is typically smaller (in resistance) than the driver output resistor 514, and provides ESD protection for the secondary driver circuit 520. For example, when the driver output resistors 514 each have a resistance of approximately 50 Ohms, the ESD resistors 524 may each be approximately 25 Ohms. The transistor pairs 522 in series with the respective ESD resistor 524 may be understood to have a configuration similar to that of the main voltage-mode driver circuit 510, and may thus be referred to as a secondary voltage-mode driver circuit. As will be discussed further below, this configuration enables the secondary driver circuit 520 to be controlled in a mode of operation to operate as a secondary voltage-mode driver circuit in parallel with the main voltage-mode driver circuit 510.

Each transistor pair 522 is connected, at the respective sources, to a pair of CML biasing transistors 526, including an NMOS transistor connected to the voltage source VTT (e.g., 1.2V voltage supply) and a PMOS transistor connected to ground. The CML biasing transistors 526 receive analog bias signals CML_bias_p and CML_bias_n, which bias the CML biasing transistors 526 to act as a current source when the secondary driver circuit 520 is operating in CML mode, as discussed further below. It should be noted that the CML biasing transistors 526 may be replaced with other circuit implementations for a controllable current source. The single pair of CML biasing transistors 526, when biased to be turned on, provide current to both transistor pairs 522.

Each transistor pair 522 is also connected, at the respective sources, to a respective pair of low-Z enabling transistors 528 (that is, there are two pairs of low-Z enabling transistors 528, unlike the single pair of CML biasing transistors 526). The low-Z enabling transistors 528 include an NMOS transistor connected to a regulated voltage Vreg which is the same regulated supply used by the voltage-mode driver circuit 510 (e.g., about 900-950 mV), and a PMOS transistor connected to ground. The low-Z enabling transistors 528 receive digital enabling signals lowz_en and lowz_enb, which are digital control signals (e.g., equivalent to binary bit values of "1" or "0"). When the low-Z enabling transistors 528 are turned on by the digital control signals, the secondary driver circuit 520 acts as a secondary voltage-mode driver circuit in parallel with the main voltage-mode driver circuit 510, as discussed further below. In some examples, the low-Z enabling transistors 528 may be replaced by any controllable switches (e.g., any switch that is controllable by the digital enabling signals lowz_en and lowz_enb).

The disclosed selectable mode transmitter driver, as illustrated by the example circuit 500, has three modes of operation.

In a first mode of operation, the CML biasing transistors 526 and the low-Z enabling transistors 528 are controlled by respective control signals (i.e., the analog bias signals CML_bias_p and CML_bias_n, and the digital enabling signals lowz_en and lowz_enb, respectively) to be turned off (e.g., by setting CML_bias_p to VTT, setting CML_bias_n to ground, and setting lowz_en and lowz_enb to "0"). This turns off the secondary driver circuit 520 and the voltage-mode driver circuit 510 operates by itself to drive the output signals at the output ports TX_M and TX_P. The maximum output swing in this first mode of operation (assuming a typical regulated voltage Vreg of about 900-950 mV), is approximately 900-950 mV.

Figure 5B:
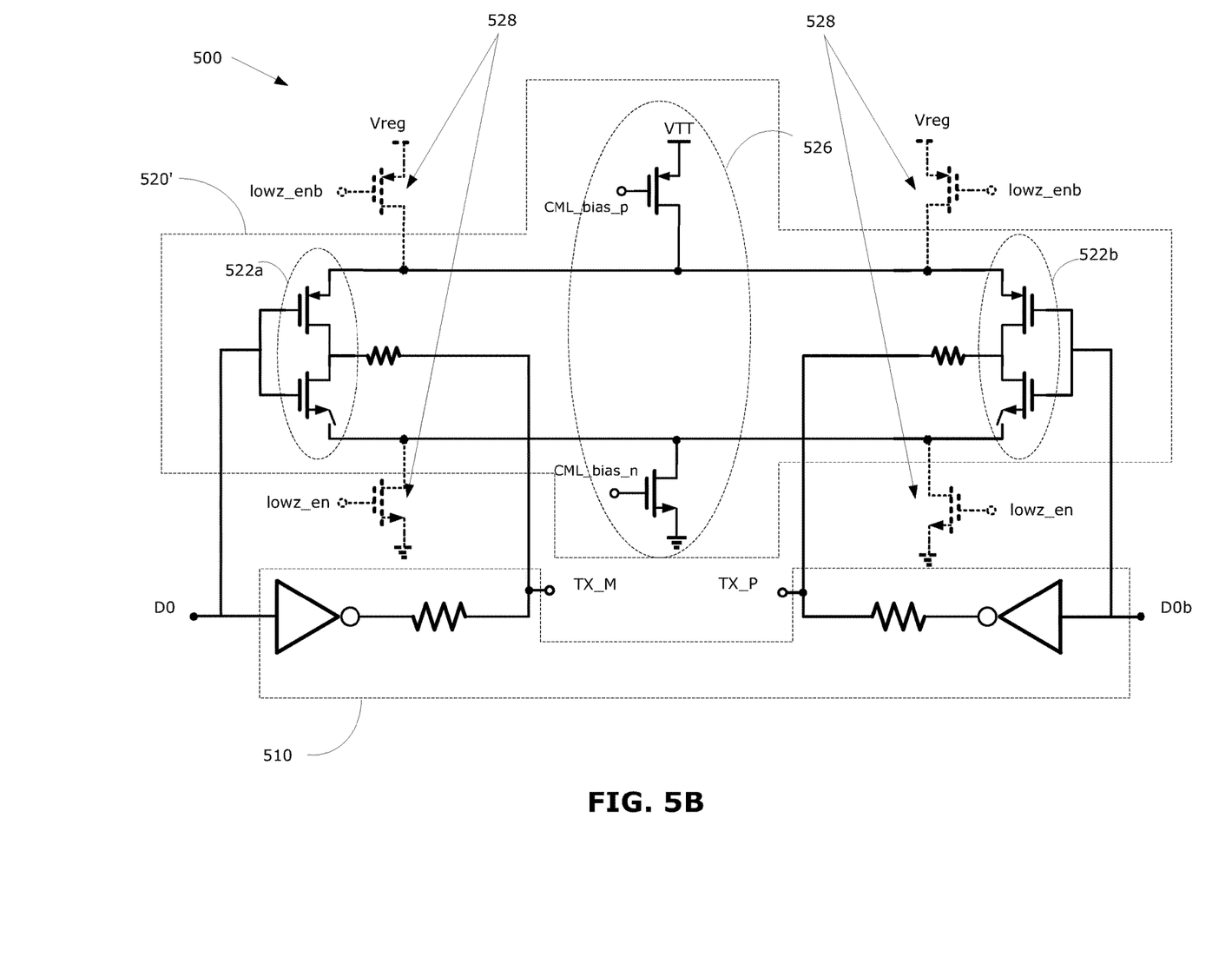
FIGS. 5B and 5C illustrate different modes of operation for the example circuit of FIG. 5A.

FIG. 5B illustrates a second mode of operation for the circuit 500. In the second mode of operation, the CML biasing transistors 526 are turned on by setting analog biasing signals CML_bias_p and CML_bias_n such that the CML biasing transistors 526 operate in the active range. For example, the analog controls signals may be set such that:

VTT>CML_bias_p>CML_bias_n>ground

In some examples, the CML biasing transistors 526 may be replaced with some other controllable current source. In such examples, the circuit 500 is operated in the second mode of operation by turning on the current source to provide a desired current boost.

In the second mode of operation, the digital enabling signals lowz_en and lowz_enb are set to bit-value "0". The low-Z enabling transistors 528 are thus turned off (i.e., effectively open circuits), as indicated by the transistors 528 being shown in dotted line. If some other controllable switches are used instead of the low-Z enabling transistors 528, the controllable switches are controlled to act as open circuits in the second mode of operation.

When biased in this way, only a portion 520' of the secondary driver circuit 520 is active. The active portion 520' operates effectively as a pseudo-CML circuit in parallel with the voltage-mode driver circuit 510. The CML biasing transistors 526 (or current source) provide a boost current (e.g., the amount of boost can be controlled by analog biasing signals CML_bias_p and CML_bias_n) that is added to the output of the voltage-mode driver circuit 510 to increase the output swing. For a typical voltage supply VTT of 1.2V, the maximum output swing that can be achieved in this second mode of operation is about 1.15V (allowing for a margin of safety to avoid EOS).

Figure 5C:
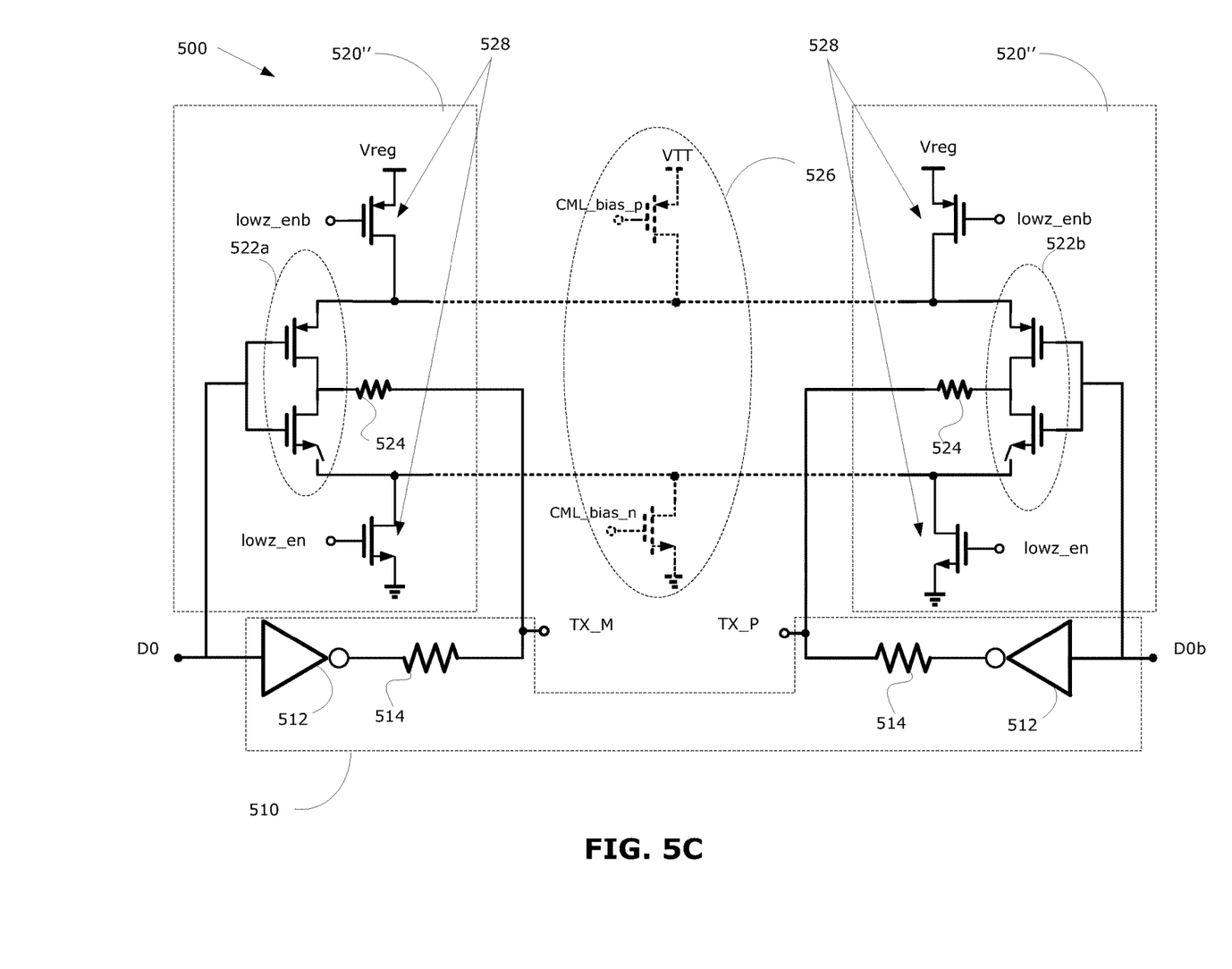

FIG. 5C illustrates a third mode of operation for the circuit 500. In the third mode of operation, the CML biasing transistors 526 are turned off (as indicated by the transistors 526 being shown in dotted line) by setting analog biasing signals CML_bias_p to VTT and CML_bias_n to ground. If the CML biasing transistors 526 are replaced with some other controllable current source, the current source is turned off in the third mode of operation. In the third mode of operation, the digital enabling signals lowz_en and lowz_enb are set to bit-value "1". The low-Z enabling transistors 528 are thus turned on. If some other controllable switches are used instead of the low-Z enabling transistors 528, the controllable switches are controlled to close (or turn on) in the third mode of operation.

When biased in this way, a different portion 520" of the secondary driver circuit 520 is active. The active portion 520" operates effectively as a secondary voltage-mode driver circuit in parallel with the voltage-mode driver circuit 510. The transistor pairs 522 act as inverters that are in parallel to the inverters 512 of the voltage-mode driver circuit 510. Further, the ESD resistors 524 provide resistance in parallel to the driver output resistors 514. Because the ESD resistors 524 are relatively small or of the same order of magnitude as the driver output resistors 514, the result is that the output impedance of the circuit 500 is lowered. Notably, the active portion 520" makes use of the ESD resistors 524 that are already included for ESD protection, rather than introducing additional resistors. For typical operating voltages, the maximum output swing that can be achieved in this third mode of operation is about 1.2V.

Figure 6:
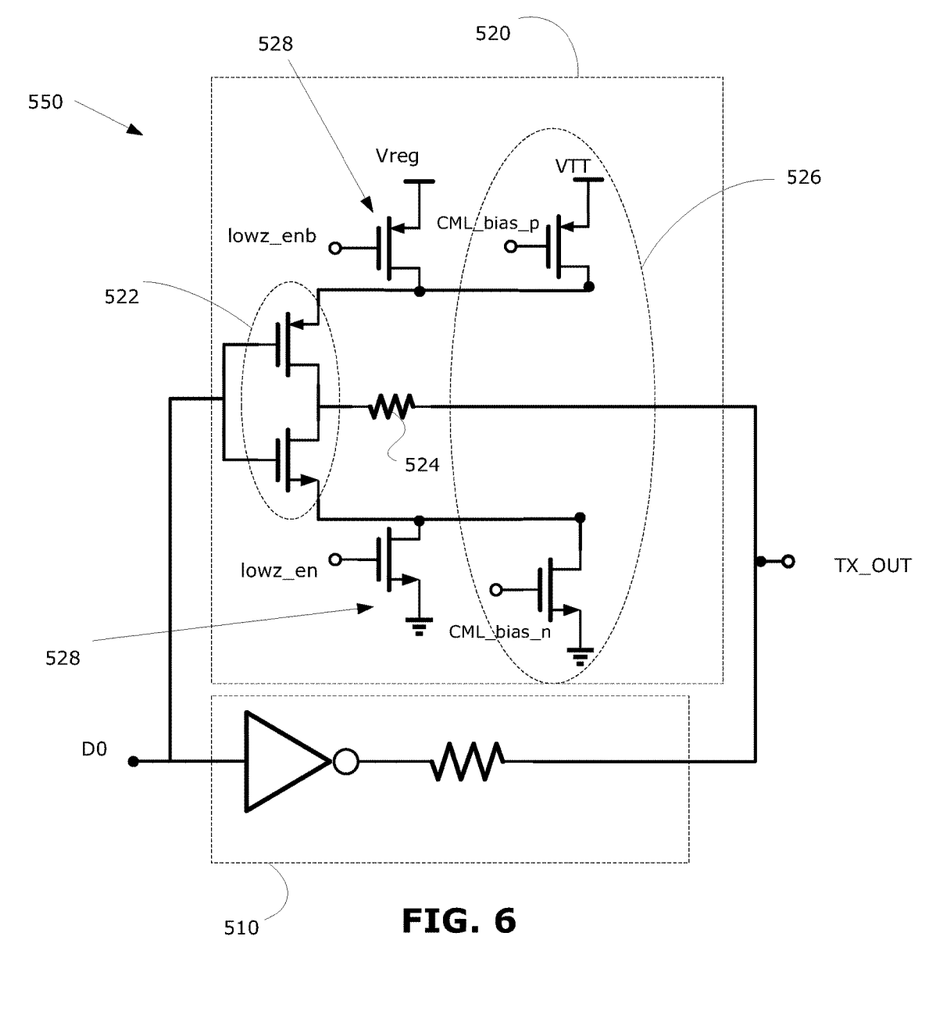
FIG. 6 is a circuit diagram for an example single-ended implementation of the transmitter driver circuit as disclosed herein.

FIG. 6 shows a circuit 550 illustrating an example single-ended implementation of the disclosed selectable mode transmitter driver circuit. The circuit 550 is similar to the circuit 500 of FIG. 5A, but in single-ended implementation. Accordingly, the circuit 550 and its three modes of operation need not be described in detail.

It is sufficient to note that the singled-ended circuit 550 similarly has a main voltage-mode driver circuit 510 (in single-ended implementation) in parallel with a secondary driver circuit 520 (in single-ended implementation). The single-ended secondary driver circuit 520 includes one transistor pair 522 connected at the gates to the single-ended input port D0, and connected at the drains to the single-ended output port TX_OUT via the ESD resistor 524. The CML biasing transistors 526 and the low-Z enabling transistors 528 are connected as described previously to the transistor pair 522. Analog biasing signals CML_bias_p and CML_bias_n, and digital enabling signals lowz_enb and lowz_en enable the circuit 550 to be controlled for operation in one of the three modes of operation, as described above.

The selectable mode transmitter driver circuit (e.g., in differential implementation as shown in the circuit 500, or in single-ended implementation as shown in the circuit 550) can be controlled to operate in one of three modes, depending on the requirements of the particular application. For example, for transmitting over a low loss channel, the first mode of operation may be used to provide a transmitter output signal that has suitable SNR, and with low power usage. For transmitting over a channel with high loss, the second mode of operation may be used to provide a transmitter output signal with boosted output swing, such that the SNR is suitable. The second mode of operation has higher power usage but does not decrease the overall impedance of the circuit, which may be desirable for applications where impedance matching is important (e.g., to avoid signal reflection). For other applications, such as optical applications and transmission over very high loss electrical channels, the negative impact of reflections may be less important than achieving maximum swing, in which case the third mode of operation may be used. In some applications, (e.g., newer optical driver applications) the load seen by the transmitter is lower (e.g., lower than 50 Ohms) and hence the third mode of operation may be useful. Thus, the selectable mode transmitter driver circuit may be controlled to operate in a mode that is more suited to the specific application.

The selectable mode transmitter driver circuit provides flexibility and adaptability. A single circuit design may be used for different applications having different SNR requirements or different channel characteristics.

The selectable mode transmitter driver circuit, as described above, is relatively simple to implement, requiring little additional chip area compared to the existing parallel pseudo-CML circuit design. Compared to the existing circuit design of FIG. 4 that adds a parallel low-Z branch, the power requirement is less, the area used is smaller, there is less circuit complexity, and there is less jitter. The benefits of the parallel low-Z circuit may be attained without the drawbacks of existing circuit designs. In addition, in some simulations, it has been found that the example circuit 500 has reduced ISI compared to existing circuit designs, and faster rise/fall times.

The disclosed selectable mode transmitter driver circuit may be used to implement one slice of a transmitter driver. Multiple instances of this circuit may be used in parallel, each instance being a respective driver slice. When there are multiple instances of the circuit in parallel, the resistance values of the resistors used in the circuit (e.g., the ESD resistor and the driver output resistor) are increased such that the parallel resistors provide an equivalent resistance that matches the transistor load (e.g., an equivalent resistance of about 50 Ohms).

The disclosed selectable mode transmitter driver circuit may be applicable to various products, including transmitters for high speed electrical or optical communications, such as those which are used in datacenters, as well as end consumer devices.

Although the present disclosure describes examples implemented in differential transmitters, the present disclosure may also be adapted for single-ended transmitters (e.g., using only high frequency booster with only one feedforward capacitor and one variable resistor).

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:
1. A transmitter driver circuit comprising:
a main voltage-mode driver circuit connected to an input port and an output port, the main voltage-mode driver circuit configured to receive an input signal at the input port and to drive an output signal at the output port based on the input signal;
a secondary circuit connected to the input port and the output port in parallel with the main voltage-mode driver circuit, the secondary circuit comprising:
a secondary voltage-mode driver circuit including an inverter circuit in series with an electrostatic discharge resistor;

a current source connected to the secondary voltage-mode driver circuit and controllable to enable or disable a current boost to the output signal; and a switch connected to the secondary voltage-mode driver circuit and controllable to enable or disable the secondary voltage-mode driver circuit to drive the output signal in parallel with the main voltage-driver circuit.

2. The transmitter driver circuit of claim 1, wherein the transmitter driver circuit is controllable to operate in one of:

a first mode of operation in which the current source is turned off and the switch is turned off, wherein the output signal is driven only by the main voltage-mode driver circuit;

a second mode of operation in which the current source is turned on and the switch is turned off, wherein the output signal is driven by the main voltage-mode driver circuit with the current boost provided by the current source; and a third mode of operation in which the current source is turned off and the switch is turned on, wherein the output signal is driven by the main voltage-mode driver circuit and the secondary voltage-mode driver circuit in parallel.

3. The transmitter driver circuit of claim 1, wherein the electrostatic discharge resistor has a resistance similar to or smaller than a resistance of the main voltage-mode driver circuit.

4. The transmitter driver circuit of claim 1, wherein the inverter circuit comprises a transistor pair, gates of the transistor pair being connected to the input port, drains of the transistor pair being connected to the output port via the electrostatic discharge resistor, and the current source and the switch being connected across sources of the transistor pair.

5. The transmitter driver circuit of claim 1, wherein the current source comprises a pair of biasing transistors, the biasing transistors being controllable by an analog biasing signal at respective gates of the biasing transistors to control the current source.

6. The transmitter driver circuit of claim 1, wherein the switch comprises a pair of enabling transistors, the enabling transistors being controllable by a digital enabling signal at respective gates of the enabling transistors to control the switch.

7. The transmitter driver circuit of claim 1, wherein the transmitter driver circuit is configured for driving a differential output signal based on a differential input signal.

8. The transmitter driver circuit of claim 1, wherein the transmitter driver circuit is configured for driving a single-ended output signal based on a single-ended input signal.

9. A transmitter comprising:

a serializer; and a transmitter driver having one or more driver slices in parallel, each driver slice comprising:

a transmitter driver circuit comprising:

a main voltage-mode driver circuit connected to an input port and an output port, the main voltage-mode driver circuit configured to receive an input signal at the input port and to drive an output signal at the output port based on the input signal;

a secondary circuit connected to the input port and the output port in parallel with the main voltage-mode driver circuit, the secondary circuit comprising:

a secondary voltage-mode driver circuit;

a current source connected to the secondary voltage-mode driver circuit and controllable to enable or disable a current boost to the output signal; and a switch connected to the secondary voltage-mode driver circuit and controllable to enable or disable the secondary voltage-mode driver circuit to drive the output signal in parallel with the main voltage-driver circuit.

10. The transmitter of claim 9, wherein each transmitter driver circuit is controllable to operate in one of:

a first mode of operation in which the current source is turned off and the switch is turned off, wherein the output signal is driven only by the main voltage-mode driver circuit;

a second mode of operation in which the current source is turned on and the switch is turned off, wherein the output signal is driven by the main voltage-mode driver circuit with the current boost provided by the current source; and a third mode of operation in which the current source is turned off and the switch is turned on, wherein the output signal is driven by the main voltage-mode driver circuit and the secondary voltage-mode driver circuit in parallel.

11. The transmitter of claim 9, wherein, in each transmitter driver circuit, the secondary voltage-mode driver circuit comprises an inverter circuit in series with an electrostatic discharge resistor.

12. The transmitter of claim 11, wherein, in each transmitter driver circuit, the electrostatic discharge resistor has a resistance similar to or smaller than a resistance of the main voltage-mode driver circuit.

13. The transmitter of claim 11, wherein, in each transmitter driver circuit, the inverter circuit comprises a transistor pair, gates of the transistor pair being connected to the input port, drains of the transistor pair being connected to the output port via the electrostatic discharge resistor, and the current source and the switch being connected across sources of the transistor pair.

14. The transmitter of claim 9, wherein, in each transmitter driver circuit, the current source comprises a pair of biasing transistors, the biasing transistors being controllable by an analog biasing signal at respective gates of the biasing transistors to control the current source.

15. The transmitter of claim 9, wherein, in each transmitter driver circuit, the switch comprises a pair of enabling transistors, the enabling transistors being controllable by a digital enabling signal at respective gates of the enabling transistors to control the switch.

16. A method of driving an output signal at a transmitter, wherein the transmitter comprises a transmitter driver circuit comprising:

a main voltage-mode driver circuit connected to an input port and an output port, the main voltage-mode driver circuit configured to receive an input signal at the input port and to drive an output signal at the output port based on the input signal;

a secondary circuit connected to the input port and the output port in parallel with the main voltage-mode driver circuit, the secondary circuit comprising:

a secondary voltage-mode driver circuit including an inverter circuit in series with an electrostatic discharge resistor;

a current source connected to the secondary voltage-mode driver circuit and controllable to enable or disable a current boost to the output signal; and a switch connected to the secondary voltage-mode driver circuit and controllable to enable or disable the secondary voltage-mode driver circuit to drive the output signal in parallel with the main voltage-driver circuit;

the method comprising controlling the transmitter driver circuit to operate in one of:

a first mode of operation in which the current source is turned off and the switch is turned off, wherein the output signal is driven only by the main voltage-mode driver circuit;

a second mode of operation in which the current source is turned on and the switch is turned off, wherein the output signal is driven by the main voltage-mode driver circuit with the current boost provided by the current source; and a third mode of operation in which the current source is turned off and the switch is turned on, wherein the output signal is driven by the main voltage-mode driver circuit and the secondary voltage-mode driver circuit in parallel.

17. The method of claim 16, wherein the current source comprises a pair of biasing transistors, the method further comprising:

applying an analog biasing signal at respective gates of the biasing transistors to control the current source, the analog biasing signal causing the current source to be disabled in the first and third modes of operation, and the analog biasing signal controlling the current boost in the second mode of operation.

18. The method of claim 16, wherein the switch comprises a pair of enabling transistors, the method further comprising:

applying a digital enabling signal at respective gates of the enabling transistors to control the switch, the digital enabling signal causing the switch to be disabled in the first and second modes of operation, and the digital enabling signal causing the switch to be enabled in the third mode of operation.

* * * * *